United States Patent [19]

Schubert

[11] 4,083,262

[45] Apr. 11, 1978

[54] POSTAGE METER CONVERSION APPARATUS

[75] Inventor: Keith E. Schubert, Rowayton, Conn.

[73] Assignee: Pitney-Bowes, Inc., Stamford, Conn.

[21] Appl. No.: 728,269

[22] Filed: Sep. 30, 1976

[51] Int. Cl.[2] .......... F16H 55/04

[52] U.S. Cl. .......... 74/436; 74/421 R; 74/96

[58] Field of Search .......... 74/412, 404, 421 R, 74/25, 63, 96, 820, 821, 817, 818, 819, 436; 235/101; 271/267, 269; 101/53

[56] References Cited

U.S. PATENT DOCUMENTS

| | | | |
|---|---|---|---|
| 2,726,812 | 12/1955 | Uhl | 235/101 |
| 3,170,333 | 2/1965 | Umbricht | 74/84 |
| 3,426,608 | 2/1969 | Loughran et al. | 74/435 |
| 3,473,390 | 10/1969 | Brown et al. | 74/435 X |
| 3,675,503 | 7/1972 | Lipadhyay | 74/820 |
| 3,952,610 | 4/1976 | Hope et al. | 74/421 R |

FOREIGN PATENT DOCUMENTS

| | | | |
|---|---|---|---|
| 293,904 | 7/1928 | United Kingdom | 74/436 |

*Primary Examiner*—Benjamin W. Wyche
*Assistant Examiner*—Wesley S. Ratliff, Jr.
*Attorney, Agent, or Firm*—Robert S. Salzman; William D. Soltow, Jr.; Albert W. Scribner

[57] ABSTRACT

A postage meter attachment or conversion apparatus is disclosed that will convert a manually lever settable postage meter into an electrically controlled postage meter. The conversion apparatus is easily assembled to and disassembled from a standard lever operated postage meter. Each lever of the meter is settable simultaneously. The motion of the drive mechanism of the conversion apparatus conforms to the arcuate motion of the meter levers, thus eliminating the need for precise alignment between the levers and the drive mechanism. The conversion apparatus can be used to make the mechanical meter compatible in an electrical environment containing equipment such as a computer, a digital scale, and other postage system processing devices.

5 Claims, 4 Drawing Figures

POSTAGE METER CONVERSION APPARATUS

This invention pertains to postal equipment, and more particularly to a conversion or attachment unit for making a standard manually settable postage meter compatible in an electrical environment.

BACKGROUND OF THE INVENTION

With more and more processing equipment becoming electrically controlled, a need is emerging for converting mechanical postal systems and equipment to electrical control.

Because present federal law prevents the direct electrical redesign of a postage meter, the invention concerns itself with the logical alternative, viz., a conversion attachment.

While conversion attachments are not new per se, the present invention features a novel mechanism packages as a unit which provides ease of adaptability, assembly, reliability and low cost of manufacture.

RELATED APPLICATION

A postage meter conversion unit not unlike the present invention is illustrated in patent application Ser. No. 705,477; filed July 15, 1976. This prior apparatus set each lever of the postage meter in a simultaneous manner, but because of the mismatch in the drive and lever motions, it required precise alignment of the drive and levers. The present inventive unit provides a drive unit which has a matching arcuate motion with that of the setting levers of the postage meter.

SUMMARY OF THE INVENTION

The invention relates to a postage meter conversion or attachment apparatus for converting a manually lever settable postage meter to an electrically controlled postage meter.

The conversion apparatus comprises a plurality of conjugate gear and cam drives; one drive for each postage meter bank. The gears for each bank are arranged in a connective intermeshing series or gear train. A motor operatively connected to each gear train is used for driving the gears. A series of cams are each connected to respective gears in each gear train. Each cam has a camming surface in one end thereof, for engaging with, and driving a lever of a respective postage meter bank. Each cam in each series of cams is slightly out of driving phase with a preceding and a subsequently adjacent cam in the series. This results in each cam progressively driving the lever in turn. In other words, as one cam completes driving the lever through a given distance, a succeeding cam engages the lever and drives it through an additional distance, and so on. Thus, each lever of said postage meter will be driven through a full range of postage meter values, i.e. from zero through nine.

Each drive train and cam series are arranged in a bifurcated or dichotomous manner to conserve on space, i.e. make the conversion unit more compact. Another space saving feature of the inventive design is achieved by mounting the cams and gears along an arcuate path conforming to the arcuate travel path of the levers. This arrangement will reduce the over all vertical dimension of the conversion unit.

An idler gear is interconnected between each cam driving gear in each gear train to provide a continuity of drive direction for each succeeding cam. The cams are generally 40° out of driving phase with each other.

While the present inventive conversion unit has a great number of parts, it is a low cost system. This is so, because each cam and each gear in the drive are essentially identical.

Each meter bank can be operated independently of the other meter banks. Thus all the banks of the postage meter can be simultaneously operated. The conversion apparatus can be used to make the mechanical meter compatible in an electrical environment containing equipment such as a computer, a digital scale, etc.

It is an object of this invention to provide an improved coversion apparatus for operating a mechanical postage meter by electrical control;

It is another object of the invention to provide a compact and low cost conversion unit for a postage meter;

It is a further object of this invention to provide a reliable conversion unit for electrically controlling a standard manually settable postage meter.

These and other objects of the invention will become more apparent and will be better understood with reference to the following detailed description taken in conjunction with the attached drawings, in which:

FIG. 1 is a cutaway perspective view of the conversion unit of this invention mounted upon a lever-settable postage meter;

FIG. 1*a* is a partial perspective view of the internal mechanism of the conversion unit of FIG. 1;

DETAILED DESCRIPTION

Figure 1:
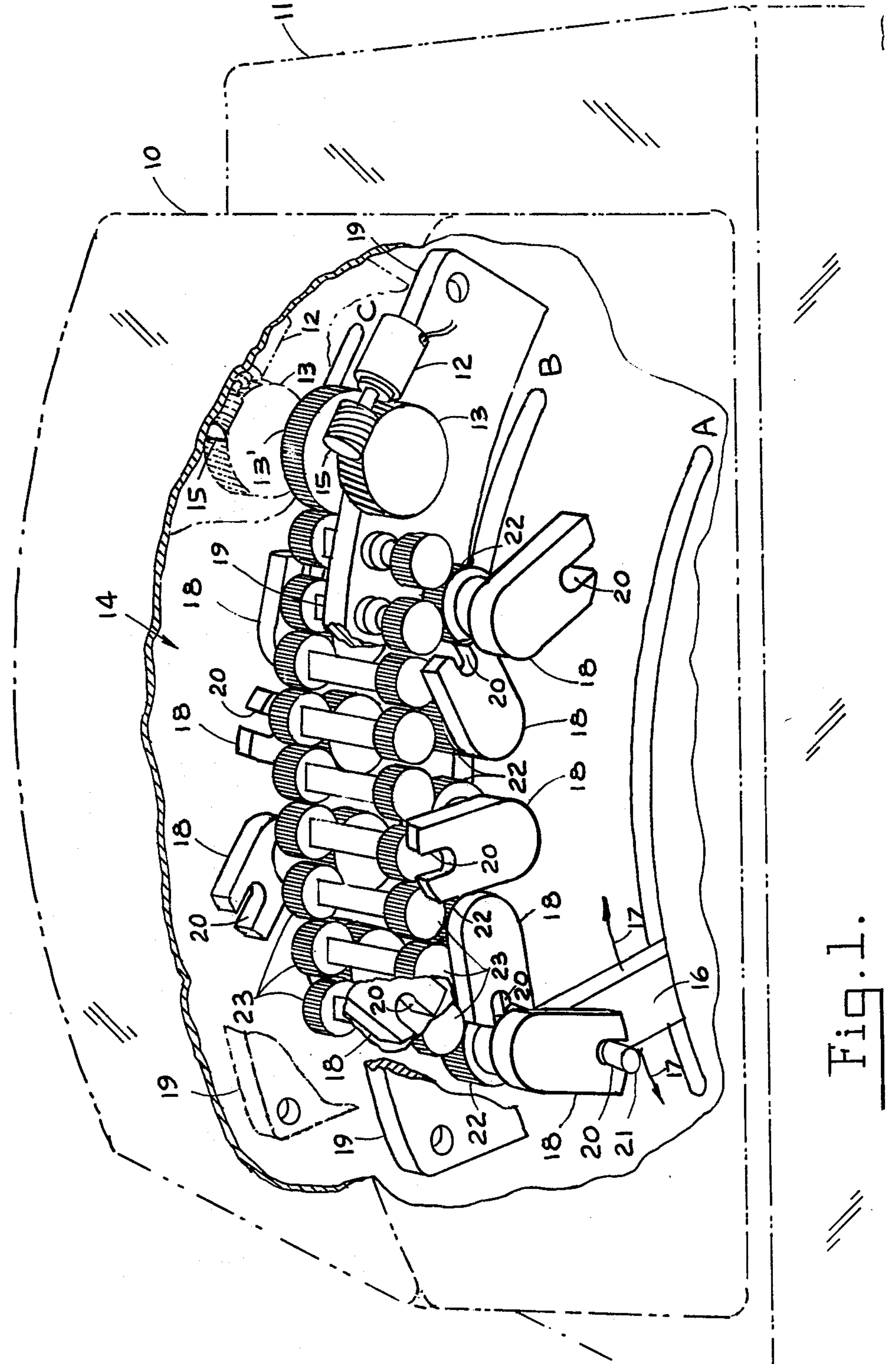

Now referring to FIG. 1 a conversion unit 10 of this invention is shown in mounting relationship to a lever-operated postage meter 11. The postage meter 11 can be a model 5300, manufactured by the present assignee of the invention, Pitney Bowes Corporation, Stamford, Connecticut. The conversion unit 10 has mounted therein a number of driving motors 12 that each rotatively drive a master gear 13, respectively, via a worm 15. There is one motor 12 for each meter bank A,B,C, etc. In the embodiment shown, there are four meter banks and, therefore, four motors. Any number of motors or banks can be used consistent with the teachings of this invention.

When each of the gears 13 are caused to rotate, they in turn drive a respective spur gear 13', which in turn drives a respective cam and gear drive, shown generally by arrow 14. The cam and gear drive 14 is more clearly shown in FIG. 1A. Gears 13 and 13' are mounted to plate 19.

A lever 16 of each postage meter bank is driven along an arcuate path of travel in either of two directions (arrows 17). The level 16 is driven by a series of identically constructed cams 18 as illustrated in FIGS. 1, 1A, 2 and 3. For the sake of brevity only one meter bank, and one cam and gear drive 14 will be described. The mechanism for each bank A, B, C, or D are identical.

Figure 1A:
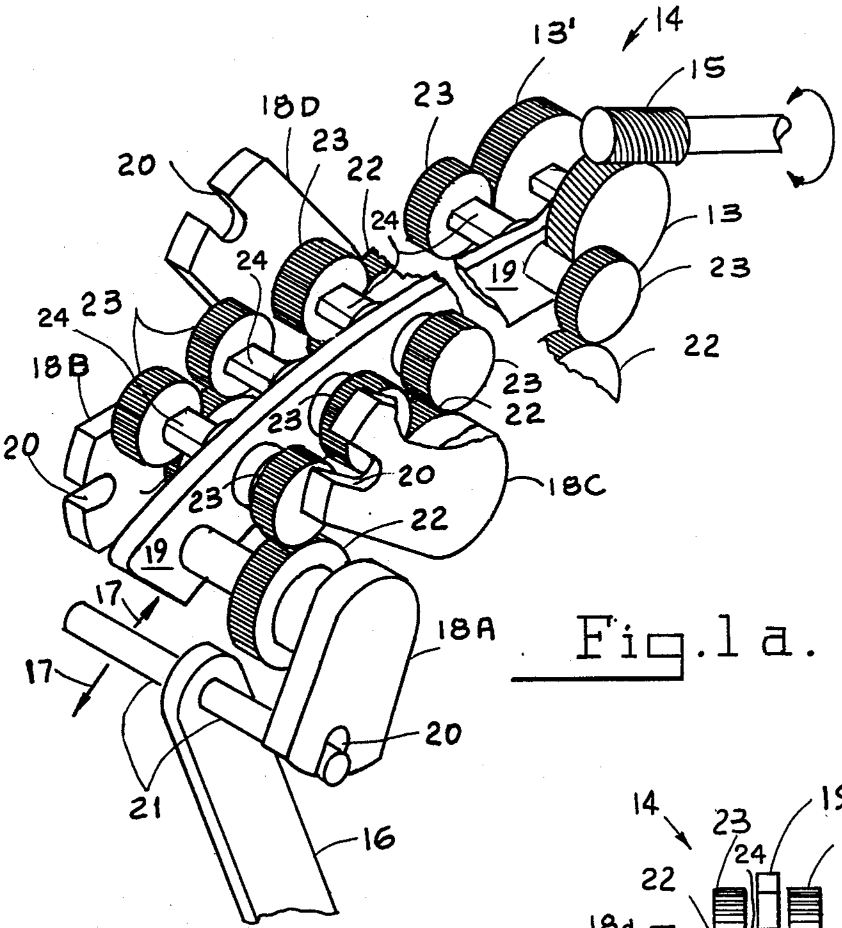
Figure 2:
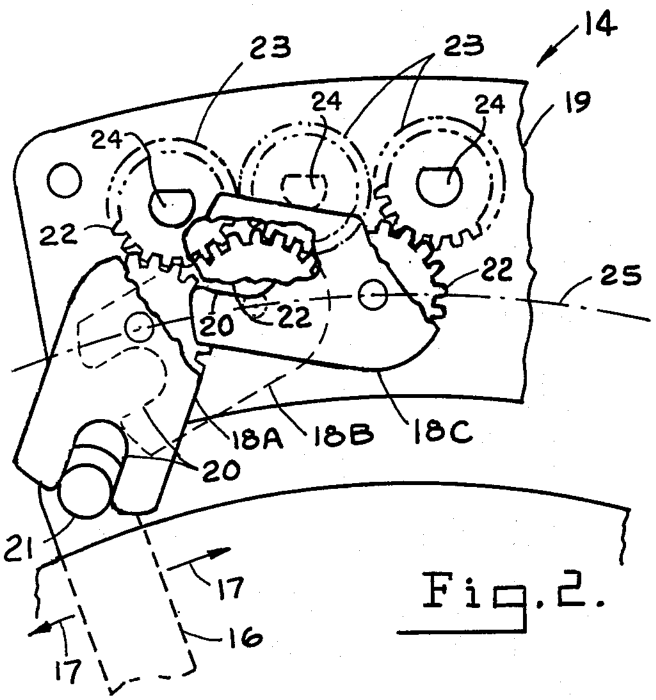
FIG. 2 is a partial side view of the mechanism of FIG. 1A.
Figure 3:
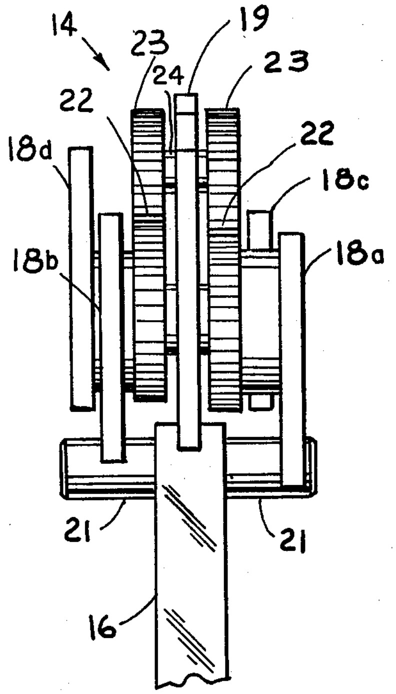
FIG. 3 is a front view of the mechanism shown in FIG. 2.

The cam and gear drive 14 is a dichotomous or bifurcated cam and gear train system containing 10 cams 18, five rotatively mounted on each side of a center plate 19 as shown in FIG. 1, and partially depicted in the succeeding FIGS. 1A, 2, and 3. Each cam 18 steps the lever 16 through one postage value position, until the lever is moved through the full range of value positions "0" through "9".

The cams 18 each have an apertured cam surface 20, that engages with a shaft 21 carried on the end of lever 16. Each cam 18 is out of driving phase with a preceding cam 18 and a successive cam 18 by approximately 40°. The cams 18 in FIGS. 1A and FIG. 2 are given a further lettered designated to illustrate the order of their phasing, i.e., 18A, 18B, 18C, 18D, etc. Thus, as cam 18A completes its driving of shaft 21, and lever 16, through a given distance, the next cam 18B begins to engage the shaft 21 (see FIG. 2).

Each cam 18 is conjugately connected to a driving gear 22, which forms part of an entire gear train. Every gear in the gear train is synchronously and simultaneously driven by the master gear 13.

Each drive gear 22 has two intermediate idler gears 23, as best seen depicted in FIGS. 1 and 1A. The purpose of the intermediate idler gears 23 is to maintain the proper driving direction for the cam driving gears 22. The reason there are two intermediate gears 23 for each drive gear 22, is seen from the fact that the gear train is bifurcated. In other words, each gear 23 connects with a corresponding gear 23 on the other side of plate 19 via a "D" shaped shaft 24, which extends through plate 19.

In this way, the motion of the gears 22 and the cams 18 is played back and forth across plate 19, thus allowing the proper sequencing of the cams 18 to take place (18A, 18B, 18C, etc; FIGS. 1*a* and 2).

The arcuate motion of the lever 16 is maintained because the cams 18 and drive gears 22 are all rotatively mounted on plate 19 in a conforming arc 25 as depicted in FIG. 2.

The reason for the dichotomous arrangement of the gears and cams, is to provide a more compact unit, and also to insure the proper phasing relationships between the moving parts.

The motors 12 are electrically actuated and controlled by a computer, computerized equipment, a scale having an electrical output, etc.

Having thus described the invention, what is desired to be protected by Letters Patent is presented by the appended claims.

What is claimed is:

1. A dichotomous conjugate gear and cam apparatus for converting a mechanical lever-settable postage meter to an electrically controlled postage meter, said conjugate gear and cam apparatus comprising:

a gear train having a plurality of gears in a connective intermeshing series;

a motor operatively connected to said gear train for driving said gear train; and a series of cams each connected to respective gears in said gear train and each having a camming surface in one end thereof for engaging with, and driving, a lever of a respective postage meter bank, each cam in said series of cams being slightly out of driving phase with a preceding and subsequently adjacent cam in said series, such that, as one cam completes driving said lever through a given distance, a succeeding cam engages said lever and drives the lever through an additional distance, and so on, whereby the lever of said postage meter bank is driven through a range of postage meter values.

2. The dichotomous conjugate gear and cam apparatus of claim 1, wherein there are four postage meter banks, and four respective motors, four respective gear trains, and four respective series of cams.

3. The dichotomous conjugate gear and cam apparatus of claim 1, wherein at least one idler gear is interconnected between each cam driving gear in said gear train to provide a continuity of drive direction for said cams.

4. The dichotomous conjugate gear and cam apparatus of claim 1, wherein each cam is approximately 40° out of driving phase with its preceding adjacent cam and its subsequently adjacent cam.

5. The dichotomous conjugate gear and cam apparatus of claim 1, wherein each gear in said gear train and each cam in said series of cams are mounted along an arcuate path conforming to an arcuate path of travel of said lever.

* * * * *